United States Patent [19]

Lowe

[11] Patent Number: 5,173,006
[45] Date of Patent: Dec. 22, 1992

[54] ARTIFICIAL REEF STRUCTURE

[76] Inventor: William R. Lowe, 6630 Viking Way Dr., Theodore, Ala. 36582

[21] Appl. No.: 731,983

[22] Filed: Jul. 18, 1991

[51] Int. Cl.[5] .................. A01B 61/00; E02B 3/00
[52] U.S. Cl. .................................. 405/25; 119/3; 119/4; 405/21; 405/30
[58] Field of Search .................... 405/21, 30–35; 119/2–5; 52/90, 79.4, 79.1; 135/100, 102

[56] References Cited

U.S. PATENT DOCUMENTS

| | | | |
|---|---|---|---|
| 3,176,698 | 4/1965 | Warner | 135/100 |
| 3,561,402 | 2/1971 | Ishida | 119/3 |
| 3,953,949 | 4/1976 | O'Sheeran | 135/100 X |
| 4,164,199 | 8/1979 | Pequegnat | 119/2 |
| 4,449,479 | 5/1984 | Saucier | 119/2 |
| 4,554,937 | 11/1985 | Irwin | 135/100 |
| 4,997,311 | 3/1991 | Van Doren | 405/30 |

*Primary Examiner*—Dennis L. Taylor
*Attorney, Agent, or Firm*—Gregory M. Friedlander

[57] ABSTRACT

A truncated pyramid structure artificial reef easily assembled on site comprised of identical panels forming openings at the top and bottom of the artificial reef and forming an opening in the side of the artificial reef at a variable distance from the bottom of the structure so as to control the sinking of the structure and the sand held by the structure.

12 Claims, 5 Drawing Sheets

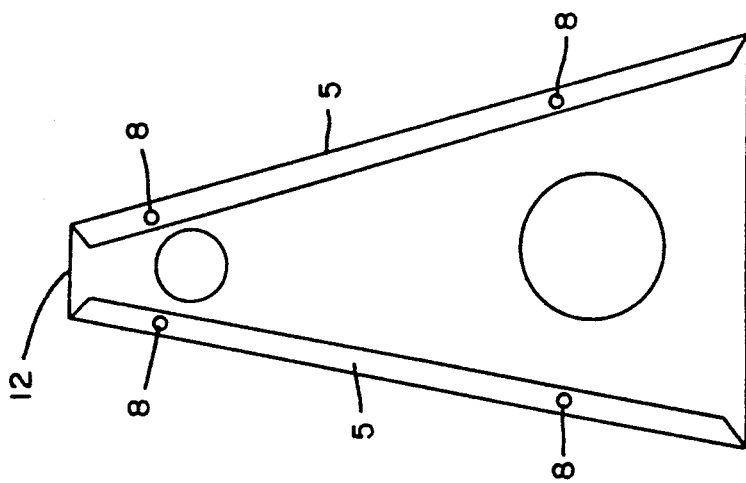
FIG. 7
FIG. 8
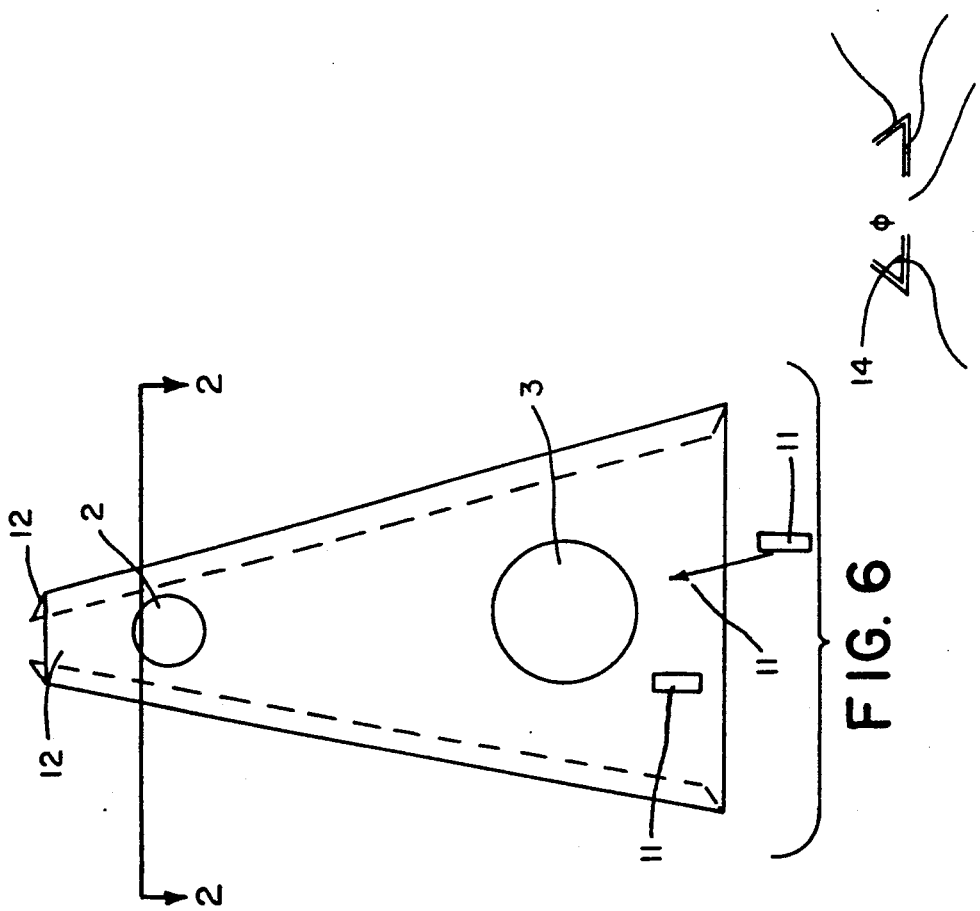
FIG. 6

ARTIFICIAL REEF STRUCTURE

BACKGROUND OF THE INVENTION

1. Field of the Invention

This invention applies to artificial reefs.

More particularly, the invention applies to artificial reefs built of component parts.

2. Prior Art

Several artificial reefs are available in the prior art. One of the methods for producing artificial reefs involves the deposit of materials at random along the sea bottom. Although this can create an excellent environment, it is not inexpensively available.

All prior art patents envision some sort of interior surface defined by an exterior surface. This is necessary as the purpose of artificial reefs is to allow smaller fish to find a safe environment from larger fish. To accomplish this, polyvinyl tubing or sheets have been used as in Kromrey, U.S. Pat. No. 3,887,739 and Jones, U.S. Pat. No. 4,913,094.

Bonded resins have also been used in the prior art to provide fencing, see Medney U.S. Pat. No. 3,755,054. Resins, such as fiberglass have been used for surfaces which are underwater. These resins are typically treated with GELCOAT or some similar material since fiberglass is generally porous and would not otherwise function in an water environment. Fiberglass has been used for reefs in a generally triangular structure weighted at the bottom, See Kajar U.S. Pat. No. 4,388,019.

The prior art structures are not easily built at the location of the reef and usually require the connection of several parts. They also are typically fairly low in height relative to the amount of material used, increasing their holding weight.

The present invention is directed towards alleviating some of the problems associated with on-site assembly as well as providing a light weight structure providing some protection for fish. The present invention also provides a surface for growth of sea life and is easily extended in size. The present invention also is easily lowered in place and provides protective walls for large and small animals as well as being easily mass produced sections.

GENERAL DISCUSSION OF THE INVENTION

This invention relates to providing a non-polluting, slow degrading artificial reef capable of being assembled at the site, being lightweight and portable and being of durable construction.

Some of the key elements of the invention include its construction using fiberglass, which is a Coast Guard approved material.

The invention is designed to avoid collapsing when set up to be assembled and lowered into place.

Panels, preferably triangular in shape, are made in molds by spraying the molds with fiberglass to make the panels.

The panels are separated from the molds and bracket clips to hold brackets are distributed around the bottom of at least some of the panels. The brackets will, when assembled hold weights, in order to weight the device to the ocean floor and also to ensure that it will drop straight down and land right side up. The brackets are designed so that weights may be added immediately before dropping the device so as to minimize the handling weight.

Electrical tie wraps, which are non-rusting plastic connectors, are used in order to connect the panels through holes provided for the tie wraps in order to maximize the useful life of the product.

Other connecting means, such as fiberglass clips, or bolts are available.

In order to have the panels fit together firmly and to prevent collapsing, each of the panels has an edge or brace which is in the preferred embodiment between thirty and fifty-five degrees from the plane formed by the panel itself. The key of this angle is to keep the panels together and to enforce the strength of the individual panels by forming ridges at the joining points.

The panels themselves have cross bracing designed as a part of the panel during the molding process in order to add strength. Additional bracing materials may be added if needed.

The fiberglass is left untreated in order to provide a rough surface for algae to stick in order to attract fish.

In addition, there are holes provided to allow water to come in and out of the product and to allow the fish to swim through.

Holes near the top allow water to drain out during the period of time when the product is being lowered, and holes may be provided for attachment to allow the product to be lowered by a rope. In the preferred embodiment, due to the weighting method developed, it is not necessary to have these holes.

It is therefore an object of the invention to provide an artificial reef of inexpensive construction which may be easily transported and assembled on site while providing a tall structure relative to the amount of material necessary to assemble the product. It is also an object of the invention to provide a reef which provides a surface for animal habitats. It is also an object of the invention to provide a reef which is lightweight and can be delivered and assembled on site. It is also an object of the present invention to provide a reef structure which is easily and inexpensively produced with a minimum number of parts to assemble.

These and other object and improvements of the invention shall become more apparent from the review of the drawings and the detailed description of the preferred embodiment which follows.

BRIEF DESCRIPTION OF THE DRAWINGS

For a further understanding of the nature and objects of the present invention, reference should be made to the following detailed description taken in conjunction with the accompanying drawings in which like parts are given like reference numerals and wherein:

FIG. 6 is a perspective view of the mold used to make a panel used in the reef of FIG. 2.

FIG. 7 is a perspective view of a panel made using the mold of FIG. 6.

FIG. 8 is a cross section through 2—2 of the mold shown in FIG. 6.

DETAILED DISCUSSION OF THE PREFERRED EMBODIMENT(S)

Figure 1:
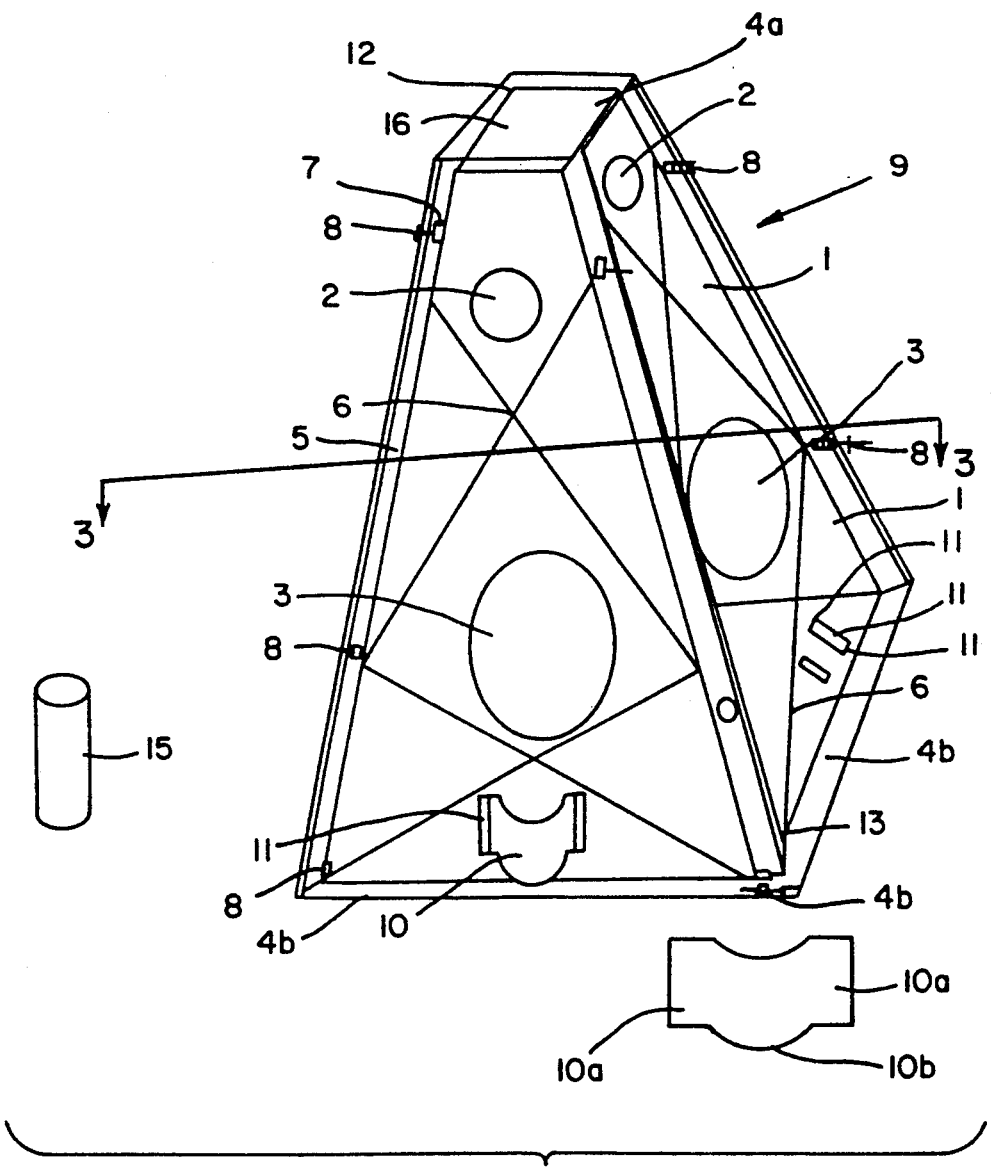
FIG. 1 is a perspective view of the assembled reef.

As can best be seen by reference to FIG. 1 the invention comprises a series of panels 1 defining a small top opening 2 and a larger bottom opening 3. The panels further define perimeter bracing which can be shown as raised longitudinal or lengthwise bracing 4 and side bracing 5. These require that the molds for the product have raised sides for these braces. These side bracings 5 are a key element of the invention. The bracings 5 provide surfaces which function to support the structure and to provide surface for attachment for assembly. This minimizes the number of connecting means necessary to hold the structure together and makes the structure easy to assemble on site since the surfaces support the structure while the connecting means are put in place.

The perimeter bracing 4 comprises a top perimeter bracing 4a and a bottom perimeter bracing 4b. In the preferred embodiment, the bracing 4b at least at bottom or foot 13 of the panel 1 is more or less perpendicular to the panel to hold the assembled reef structure 9 upright and ballanced on the sea floor on which the assembled reef structure will rest.

Figure 3:
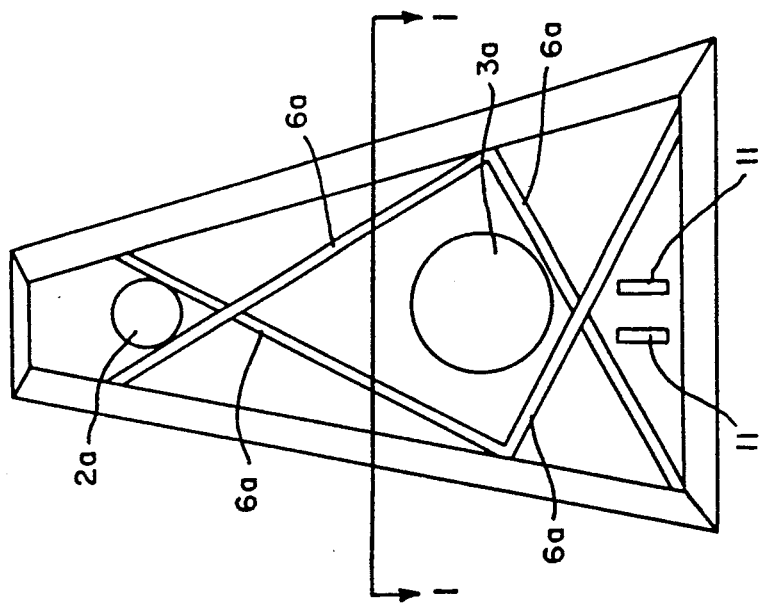
FIG. 3 is a perspective view of the mold used to make a panel used in the reef of FIG. 1.

In addition, cross bracing 6 provides bracing across the face of the panel 1. The cross bracing 6 may be in any form. It may be accomplished by having embedded rods or supports. In the preferred embodiment, the cross bracing 6 is accomplished by having raised fiberglass ridges as shown in FIG. 3. These are prepared in the molding stage by having ridges 6a in the mold 1a which result in ridges 6 in the fiberglass panels 1.

The panel 1 is equipped near the foot 13 of at least one and preferably all of the panels 1 is fitted with a set of brackets 11 which comprise strips of fiberglass, in the preferred embodiment which are sealed at the bracket top 11a and bracket bottom 11b and define thereby a slit 11c between the top 11a and bottom 11b. A weight bucket 10 designed to hold a weight 15 may be inserted into the two brackets by way of side facing 10a which fit within the brackets 9 on either side of a bucket well 10b. The weight 15 can be placed into the bucket well 10b which is located at the foot 13 of the panel so that the weight within the bucket rests against the bottom perimeter bracing 4a.

The side bracing 5 defines tie holes 7 which can be made to hold bolts 8, electrical ties 8 or other connecting means 8. In order to hold the device stable, at least two connecting means 8, one at the panel top 12 and one at the panel foot or bottom 13 are necessary. As many as eight tie holes 7 per side brace 5 are used in the preferred embodiment. The tie holes 7 on one panel must line up with those on the adjoining panel 1 so that the connecting means 8 can fit through.

As can best be seen by reference to FIG. 3, the mold 1a has a raised top cylinder 2a corresponding to the top opening 2 and a raised bottom cylinder 3a corresponding to bottom opening 3 of the panel 1. The distance between the bottom cylinder 3a and the bottom of the mold 13a is adjustable so that the height of the bottom cylinder 3a from the bottom or foot 13a of the mold 1a is adjustable so that the height of the bottom opening 3 may be varied relative to the foot 13 of the panel 1. This is important since the size and height of the bottom opening 3 controls the amount of sand which collects in the bottom of the assembled structure 9. As water passes through the large bottom opening 3, the water circulates, carrying out and dropping sand. The higher the large opening 3, the more sand collects in the bottom of the structure 9. It should be noted that holes must be in place on at least two sides of the assembled structure to allow water to circulate. The sand which collects in the interior of the assembled structure helps to anchor the device to the sea floor and to prevent drifting allowing for less weight to be used in the assembly of the product.

Figure 2:
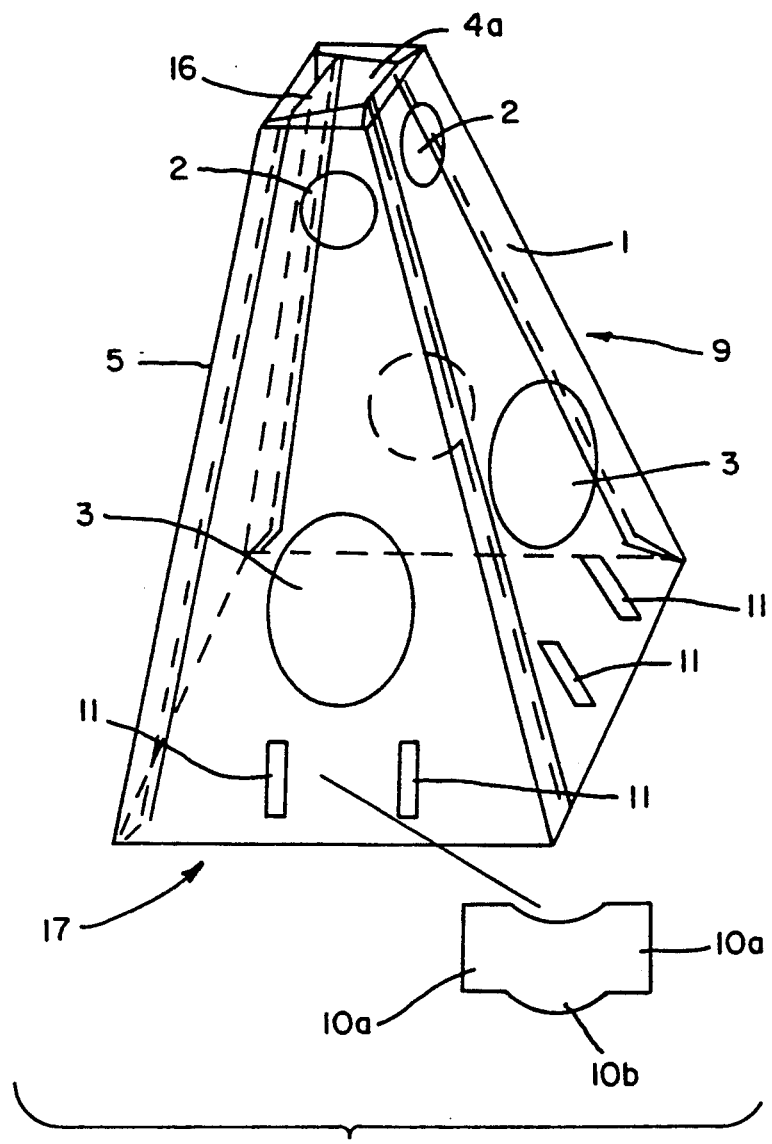
FIG. 2 is a perspective view of an alternative embodiment of the assembled reef showing an interior view and showing inward facing braces.

The raised sides of the mold 1a result in raised bracing 5 and 4 when the mold is sprayed with fiberglass. As can best be seen by FIG. 4, the longitudinal sides 18 of the mold are angled at an angle 14 of greater than 90 degrees. An angle of less than 90 degrees may also be used for the same effect. The purpose of this angle 14 is to allow the sections to lean together increasing the strength of the assemble structure as described in more detail below. It should be noted that if the the angle 14 is less than 90 degrees, the side bracing 5 will be inside of the assembled structure 9 and therefore require that the ties or bolts or other connecting means 8 be put in place from within the structure. FIG. 2 shows the device as it would appear with the bracing facing inward. In this embodiment, the edges where one panel 1 meets another panel 1 would appear smooth as opposed to having ridges formed by the meeting of side bracing 5 of two separate panel 1.

Figure 5:
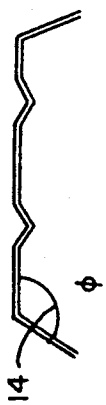
FIG. 5 is a cross section through 1—1 of the mold shown in FIG. 3.
Figure 9:
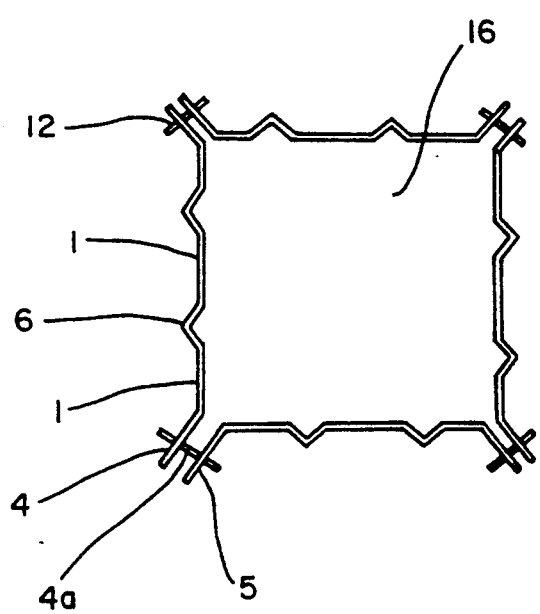
FIG. 9 is a cross section through 3—3 of FIG. 1.

The angle 14 is determined by the degree of angle 14 necessary in order to have the sections used fit together. In the preferred embodiment, the invention consists of multiple panels 1 fitted together in order to arrive at a pyramidal type structure of usually three or four panels 1. FIG. 9 shows how a cross section through the 1—1 axis of FIG. 1 would appear. FIG. 5 shows how a cross section of an individual panel would appear through the cross section 1—1 of FIG. 3.

As can best be seen by reference to FIG. 2, an alternate embodiment with exists with the angle 14 of the panel side bracing 1 being turned inward. The invention is otherwise the same with panels 1 shown in FIG. 6 being formed from frames FIG. 6 with the side bracing 5 having angles, as best seen in FIG. 8 of less than 90 degrees from the plane of the panel 1.

The number of holes or openings 2 and 3 is variable. The major controlling points in the number and size and placement of the holes is that too many may effect the structural integrity or let too much sand out. Similarly, if the holes effected the strength of the structure by their placement, a change may be desired. In fact, the holes could be formed at the junctures of the panels 1 where they have the side bracing 5. This is not done in the preferred embodiment as this would weaken the structure formed, but this might be done if an acceptable amount of weakening was the result. In fact, small spaces typically do appear where the side bracings 5 of one panel 1 do not perfectly meet those side bracings 5 of another panel 1.

The invention comprises, in the preferred embodiment shown in FIG. 1 four joined panels 1. By changing the angle 14 of the side bracing 5 from the panel 1, the number of panels may be decreased to three or increased to any number. Each panel 1 is shaped in an approximate triangle with the top of the triangle removed. In this way, when the panels 1 are joined, an overhead opening 16 is formed at the top of the pyramid formed by the assembled reef structure and an underside opening 17 is formed at the bottom of the pyramid. These openings 16 and 17 assist in having the assembled structure drop straight to the bottom right side up since they allow water to flow into the reef from the bottom where the underside opening 17 is formed as the reef drops and allows air and water to flow through the overhead opening 16 as the structure drops.

The height of the raised longitudinal sides 5 is usually 2" and must usually be at least one inch in height in order to give sufficient strength when tie holes are drilled.

The bottom and top sides 4a and 4b need not be angled. The bottom bracings are flat so as to allow the reef to rest flat on the sea floor and to provide that the weight rest against a flat surface. It should be obvious that if four panels are used that one or more of the joining places may join by way of matching side bracing 5 turned inward as shown in FIG. 8 while one or more may be joined by having matching side bracing turning outward as shown in FIG. 5 as long as two panels had one side with bracing 5 at an angle of less than 90 degrees and another had a side of greater than 90 degrees. The purpose of such an arrangement can be seen in that it allows for as many as three of the four junctures of panel side bracings 5 to meet inside giving potentially greater strength and providing interal surfaces to trap sand made up of the inward turned panels. The one juncture of panel side bracings 5 turned outward, as shown by FIG. 5 would allow for the assembler to assemble the panels by inserting the ties from within the structure and then leave the inside of the structure through the opening of the juncture having side bracings 5 turned outward and then to seal that juncture from the outside.

The panel openings 2, 3 and 16 of the assembled structure also serve to allow water and sea life to enter and exit the reef as it remains on the ground.

Figure 4:
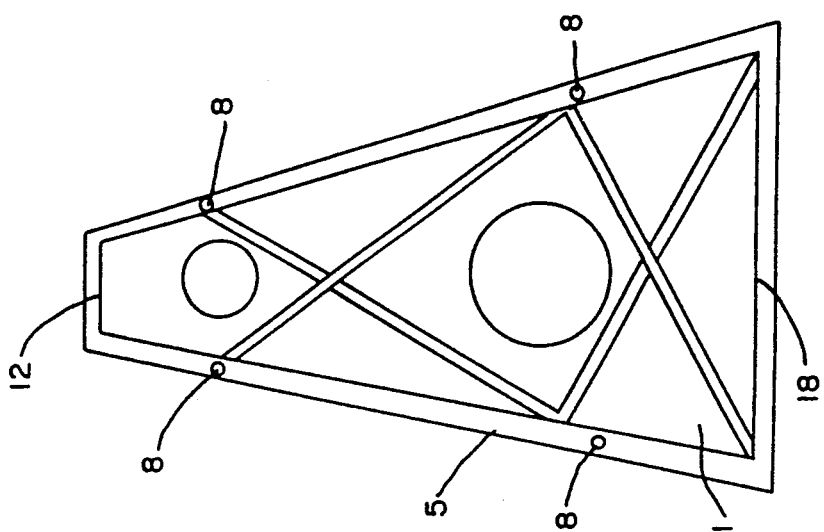
FIG. 4 is a perspective view of a panel made using the mold of FIG. 3.

The panels 1, once assembled, can be joined by several methods or connecting means 8. One method would be to fiberglass the meeting points of the longitudinal bracing of one panel to the next adjoining panel. Since one of the major objectives of the invention is to provide for a reef which can be assembled easily on location in the water, a faster setting connecting means is usually desirable. In the preferred embodiment, this connecting means comprises either electrical ties or plastic bolts. It should be obvious given these examples that any nondegrading or slow degrading connection would be appropriate to join the members. The final panel shown as FIG. 4 shows that holes 7 have been drilled for ties to be inserted.

The assembly of the product occurs by taking individual panels manufactured in the fashion outlined above.

Internal bracing may be used to strengthen the structure provided by the present invention. This could be accomplished by having internal rods running between panel 1 to further shore up the pyramidal structure.

In a standard structure standing seven feet tall, a overhead opening of six inches is sufficient. The bottom opening may be four feet. The holes must be sufficiently large to allow water in as the device is submerged or the invention will collapse. Typically, the top opening defined by the meeting of four panels is 5", the panel top holes are 4", and the bottom holes each measure approximately 13 inches. The height of the bottom hole is from 24 inches to three feet off the bottom of the device to allow the accumulation of between one foot to 18 inches of sand in the bottom. The variability of this height is a major improvement of the invention. The width of the panels 1 is less than one inch. For this type of structure, with a weight 15 in each of four buckets 10, weights of 30 pounds each, made of concrete cylinders are usually sufficient.

As can be seen, by varying the shape of the panels 1, the shape of the ultimate assembled reef may be changed. Several units made of individual assembed structures 9 may be joined to form a single reef of multiple units.

PROCESS

As can be seen, the product described above can be performed by virtue of a process which is not disclosed by the prior art and consists of the steps of:

Step 1: determining the number of panels 1 to be joined.

Step 2: Determining the angle of the side bracing 5 to the panel face 5 so as to have the panels fit together at the side bracing 5 given the number of panels set forth in step 1.

Step 3: Determine based on the amount of sand of slit in the body of water plus the expected currents the height to be given to the bottom holes 3 above the surface of the sea bed.

Step 4: Determining what other holes are necessary to provide access to fish and to allow water to drain from the device as it is lowered to the bottom of the seabed.

Step 5: Preparing fiberglass molds of the form determined by the height of the reef desired and the angles needed in Step 2.

Step 6: Preparing fiberglassing panels within the molds prepared in Step 4.

Step 7: Cutting out holes as determined in Step 3 and step 4.

Step 8: Determine the amount of weight necessary given the location of the reef.

Following the preparation of the panels, the device may be transported and easily assembled on slight utilizing the additional steps of:

Step 9: Joining panels 1 together at the front face of panels or by locating the several sections together at their footings.

As can easily be seen, given the shape of the product and structural, integrity, even if the reef is turned over it may maintain some of its function.

I claim:

1. An artificial reef enclosure comprising:
    (a) a plurality of panels having a top, a foot and two sides, said panels having opening means operating to create turbulance within the enclosure comprising a plurality of openings at a height above the foot of the panel which openings are of variable size and location in order to control the amount of circulation and turbulance desired within the enclosure to prevent the buildup of sand or silt;
    (b) a bracing means on either side of said panels operating to join one panel with another and in a supported position.

2. The artificial reef enclosure of claim 1 wherein the bracing means further comprises a bent edge on either side of the panels at an angle of between 30 and 45 degrees to form a face so that each edge face of one panel intersects and lays flat against a second edge face from an adjoining panel at a like angle.

3. The artificial reef enclosure of claim 2 wherein the bracing means further comprises a connecting means which functions to hold the edge face of one panel loosely against the edge face of the adjoining panel so that the two faces may move against one another to allow for water and air to pass between the faces of adjoining panels as the enclosure submerges.

4. The artificial reef of claim 1 wherein the opening means further comprises at least two openings with the first of said openings being smaller and closer to the top of the panel than the second of the openings so that as the enclosure is lowered into the water and allowed to sink air passes throught the second opening at a greater rate causing the bottom of the panel to tend to drop before the top of the panel so that the enclosure drops in an upright position.

5. The artificial reef of claim 2 comprising at least three panels and wherein the panels are of a triangular shape so that when the panels are attached along the bracing means a pyramidal shaped reef is formed.

6. The artificial reef of claim 1 wherein there are at least one opening on each of two separate panels to allow for the flow of water through the reef structure.

7. The artificial reef of claim 1 wherein opening means further comprises an opening defined by the length of the panel top being shorter than the length of the panel bottom so that the panels have a triangular form truncated at the top so that the assembled reef defines an opening at the top of the reef so that as the enclosure is lowered into the water and allowed to sink air passes through the opening at the top causing the bottom of the panels to tend to drop before the top of the panels so that the enclosure drops in an upright position.

8. The artificial reef of claim 1 further comprising (c) a removable weight means which functions to bias the enclosure to the bottom of the sea.

9. The artificial reef structure of claim 8 wherein the removable weight means comprises a plurality of weight holders attached to the panels at a location closer to the bottom of the panels than the top of the panels and a set of weights insertable within the weight holders so that the weights when inserted, being closer to the bottom of the panel, tend to keep the bottom lower than the top so that the enclosure falls upright when it is lowered into the water.

10. The artificial reef structure of claim 3 wherein the connecting means comprises a tie hole defined by the panel edges of adjoining panels at the same height and an electric tie running through the tie holes of adjoining panels.

11. The artificial reef structure of claim 10 wherein the electric tie is replaced by a bolt.

12. The artificial reef structure of claim 10 wherein the tie hole is replaced by a pourous fiberglass strip.

* * * * *